United States Patent
Han et al.

(10) Patent No.: US 10,598,419 B2
(45) Date of Patent: Mar. 24, 2020

(54) SEAWATER FLUIDIZED ICE MANUFACTURING EQUIPMENT AND METHOD

(71) Applicant: ZHEJIANG OCEAN UNIVERSITY, Zhoushan, Zhejiang Province (CN)

(72) Inventors: Zhi Han, Zhoushan (CN); Zhen Wang, Zhoushan (CN); Roujia Zhang, Zhoushan (CN); Pengfei Zhang, Zhoushan (CN); Yaying Zhang, Zhoushan (CN); Wenqi Zhao, Zhoushan (CN); Tao Jiang, Zhoushan (CN); Wei Wang, Zhoushan (CN); Binju Wang, Zhoushan (CN); Yu Wang, Zhoushan (CN); Sheng'ao Shi, Zhoushan (CN); Yang Chen, Zhoushan (CN); Binhui Jin, Zhoushan (CN); Yiying Dong, Zhoushan (CN); Hongwei Gui, Zhoushan (CN); Zhihao Du, Zhoushan (CN); Jiawei Zheng, Zhoushan (CN); Ronglian Wei, Zhoushan (CN); Tianle Xu, Zhoushan (CN); Wanglai Kuang, Zhoushan (CN); Hongli Shan, Zhoushan (CN); Tianwen Lu, Zhoushan (CN); Xiaowen Shang, Zhoushan (CN); Xin Li, Zhoushan (CN); Kening Sun, Zhoushan (CN); Wenjun Zhang, Zhoushan (CN); Libiao Zhou, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 72 days.

(21) Appl. No.: 15/837,695

(22) Filed: Dec. 11, 2017

(65) Prior Publication Data
US 2018/0335239 A1    Nov. 22, 2018

(30) Foreign Application Priority Data

May 19, 2017  (CN) .......................... 2017 1 0354996
May 19, 2017  (CN) .......................... 2017 1 0354997
May 19, 2017  (CN) .......................... 2017 1 0354998

(51) Int. Cl.
*F25C 1/12*    (2006.01)
*F25C 5/182*   (2018.01)
(Continued)

(52) U.S. Cl.
CPC ................... *F25C 1/12* (2013.01); *C02F 1/22* (2013.01); *C02F 1/36* (2013.01); *F25C 1/145* (2013.01);
(Continued)

(58) Field of Classification Search
CPC .... F25C 1/12; F25C 1/14; F25C 1/145; F25C 1/147; F25C 1/20; F25C 5/18;
(Continued)

(56) References Cited

U.S. PATENT DOCUMENTS 3,650,121 A * 3/1972 Kimpel ................... F25C 1/147
                                              62/136
4,354,360 A * 10/1982 Fiske ................... F25B 43/006
                                              241/DIG. 17
(Continued)

FOREIGN PATENT DOCUMENTS

CN         201589481 U         9/2010
EP           2284460 A1 *      2/2011    .............. F25B 39/04
WO    WO-2012104787 A1 *      8/2012    ................ C02F 1/22

*Primary Examiner* — Cassey D Bauer
*Assistant Examiner* — Miguel A Diaz
(74) *Attorney, Agent, or Firm* — Innovation Capital Law Group, LLP; Vic Lin

(57) ABSTRACT

Seawater fluidized ice manufacturing equipment is disclosed, comprising a compressor; a condenser, connected with the compressor, the condenser being internally pro-
(Continued)

vided with a condensing agent; a heat exchanger, connected with the condenser, the heat exchanger being provided with a hydrophobic material coating; and an ultrasonic generator, connected with the heat exchanger. A seawater fluidized ice manufacturing method is also disclosed, comprising the following steps: compressing low-temperature and low-pressure condensing agent vapor in an ice making barrel into high-temperature and high-pressure condensing agent vapor by the compressor; driving the seawater to enter the ice making barrel and the liquefied condensing agent into a cooling pipe, condensing the seawater into fluidized ice, wherein when the seawater is condensed in the ice making barrel, the ultrasonic generator generates ultrasonic waves to drive the seawater to crystallize into fluidized ice.

8 Claims, 7 Drawing Sheets

(51) Int. Cl.
| | | |
|---|---|---|
| *C02F 1/22* | (2006.01) | |
| *F25C 1/145* | (2018.01) | |
| *F28F 1/02* | (2006.01) | |
| *F28F 21/08* | (2006.01) | |
| *F28D 1/06* | (2006.01) | |
| *C02F 1/36* | (2006.01) | |
| *F28F 13/00* | (2006.01) | |
| *C02F 103/08* | (2006.01) | |

(52) U.S. Cl.
CPC ................ *F25C 5/182* (2013.01); *F28D 1/06* (2013.01); *F28F 1/02* (2013.01); *F28F 13/003* (2013.01); *F28F 21/085* (2013.01); *C02F 2103/08* (2013.01); *F25C 2301/002* (2013.01); *F25C 2400/14* (2013.01); *F25C 2500/08* (2013.01)

(58) Field of Classification Search
CPC .... F25C 5/182; C02F 1/22; C02F 1/36; C02F 2103/08; C02F 2103/002; F28D 1/02; F28D 1/06; F28F 17/00; F28F 19/02; F28F 19/006; F28F 2245/04
See application file for complete search history.

(56) References Cited

U.S. PATENT DOCUMENTS

| | | | | |
|---|---|---|---|---|
| 4,984,360 | A * | 1/1991 | Sather | B21D 11/06 29/890.037 |
| 4,991,407 | A * | 2/1991 | Alvarez | F25C 1/147 165/133 |
| 5,065,817 | A * | 11/1991 | Alvarez | F25C 1/147 165/153 |
| 6,658,889 | B2 * | 12/2003 | Krylov | C02F 1/22 62/544 |
| 8,642,171 | B2 * | 2/2014 | Liu | B05D 5/083 428/323 |
| 9,476,628 | B2 * | 10/2016 | Potgieter | F28D 7/16 |
| 2002/0194865 | A1 * | 12/2002 | Krylov | C02F 1/22 62/544 |
| 2003/0010055 | A1 * | 1/2003 | Kuroyanagi | F25C 1/147 62/354 |
| 2004/0112841 | A1 * | 6/2004 | Scott | B01J 8/005 210/748.05 |
| 2006/0245987 | A1 * | 11/2006 | Schmidt | B01J 19/0093 422/198 |
| 2008/0053787 | A1 * | 3/2008 | Bagajewicz | B01D 61/00 196/111 |
| 2008/0282711 | A1 * | 11/2008 | Hawkes | F25C 1/147 62/56 |
| 2014/0223958 | A1 * | 8/2014 | McCormack | B01D 9/0009 62/533 |
| 2015/0210563 | A1 * | 7/2015 | Tomlin | C02F 1/22 210/774 |
| 2016/0346758 | A1 * | 12/2016 | Kress | B01F 5/0057 |
| 2017/0008778 | A1 * | 1/2017 | Aly | C02F 1/22 |
| 2019/0300394 | A1 * | 10/2019 | Miyakawa | C02F 1/441 |

* cited by examiner

```
┌─────────────────────────────────────────────────────────────────────┐
│ Compressing the low-temperature and low-pressure condensing agent   │
│ vapor in the ice making barrel into high-temperature and high-      │
│ pressure condensing agent vapor and sending the high-temperature    │
│ and high-pressure condensing agent vapor into the condenser by the  │
│ compressor, condensing the condensing agent vapor into the liquid   │
│ in the condenser.                                                   │
└─────────────────────────────────────────────────────────────────────┘
                                   │
                                   │
┌─────────────────────────────────────────────────────────────────────┐
│ Driving the seawater into the ice making barrel and the liquefied   │
│ condensing agent into the cooling pipe, enhancing the heat exchange │
│ efficiency by nano-particles and foamed metal to condense the       │
│ seawater into the fluidized ice.                                    │
└─────────────────────────────────────────────────────────────────────┘
                                   │
                                   │
┌─────────────────────────────────────────────────────────────────────┐
│ When the seawater is condensed in the ice making barrel, generating │
│ ultrasonic waves at a frequency of 25KHz- 40 HKz in the ice making  │
│ barrel by the ultrasonic generator such that the seawater generates │
│ a cavitation effect in the ice making barrel and then the seawater  │
│ crystallizes into fluidized ice.                                    │
└─────────────────────────────────────────────────────────────────────┘
```

FIG 7

SEAWATER FLUIDIZED ICE MANUFACTURING EQUIPMENT AND METHOD

BACKGROUND OF THE INVENTION

1. Technical Field

The present disclosure relates to the technical field of seafood preservation equipment, and also relates to a method for using the equipment to manufacture seawater fluidized ice.

2. Description of Related Art

The muscular tissue of aquatic products is fragile, has high water content, is quickly autolyzed, and rots more easily in comparison with common animal meat. In terms of food preservation, temperature is the most important factor. Therefore, the mainstream of seafood preservation is low-temperature preservation. However, existing widely applied seafood low-temperature preservation technologies (such as cold storage, cold seawater, ice temperature, freezing, etc.) all have certain defects, and the main problems focus in the aspects of damage of the histocytes of the seafood, and poor control over the preservation temperature, etc.

Fluidized ice technology refers to a technology for manufacturing a solid-fluid two-phase solution which contains a great amount of suspended ice crystal particles of which the diameter is usually not greater than 1.0 mm (the smallest fluidized ice diameter is 20.0 um). Fluidized ice has a high heat exchange efficiency and strong mobility, and can be delivered with pumps. Fluidized ice technology is an internationally booming novel cold storage technology, but is mainly applied to the construction fields such as ice cold storage air conditioners and mineral well cooling.

The fluidized ice particles are smooth and round, do not damage the surface of the seafood, have fine diameters and can enter tiny holes to completely wrap the seafood and achieve a good sealing effect; at the same time, a huge amount of ice crystal particles gathering together can reach a very high ice surface ratio, enhance the heat exchange efficiency, and cool the seafood quickly.

The existing seawater fluidized ice manufacturing equipment has a low heat exchange efficiency and a relatively large volume, takes a long time to make ice, tends to generate ice-blockage, and therefore achieves undesirable effects in use and has a certain room for improvement.

BRIEF SUMMARY OF THE INVENTION

The objective of the present disclosure is to provide seawater fluidized ice manufacturing equipment and method to solve problems in the prior art.

The objective of the present disclosure can be achieved by the following technical solutions. Seawater fluidized ice manufacturing equipment includes:

a compressor for compressing a condensing agent into condensing agent vapor;

a condenser, connected with the compressor, wherein the condenser is internally provided with a cooling medium, the condensing agent vapor passes through the condenser and then forms a liquefied condensing agent;

a heat exchanger, connected with the condenser, wherein the heat exchanger is provided with a hydrophobic material coating, the heat exchanger communicates with seawater, seawater is cooled by the liquefied cooling agent to form fluidized ice; wherein the heat exchanger comprises an ice-making barrel and a cooling pipe, the cooling pipe is a semi-round copper pipe, the cooling pipe closely fits the outer wall of the ice-making barrel, the ice-making barrel is connected with a seawater purification module, the cooling pipe receives the condensing agent and enables the seawater in the ice-making pipe to crystallize into fluidized ice;

wherein the cooling pipe is internally provided with nano-particles and foamed metal, the nano-particles enhance energy exchange in a refrigerant, the foamed metal improves the efficiency of heat exchange between the condensing agent and the seawater;

a disturber, disposed on the inner wall of the ice-making barrel, the disturber enabling cold and hot fluids to directly exchange heat;

an ultrasonic generator, connected with the heat exchanger, the ultrasonic generator generating ultrasonic waves and transmitting the ultrasonic wave into the heat exchanger to enable the seawater in the heat exchanger to crystallize into ice;

an insulating ice storage tank, connected with the heat exchanger, wherein the fluidized ice made in the heat exchanger is conveyed to the insulating ice storage tank for storage;

a data sampler, wherein the data sampler is connected with thermocouples, and the thermocouples are disposed in the insulating ice storage tank for measuring the temperature of the fluidized ice;

wherein a liquid storage device, a dryer and an expansion valve are disposed between the condenser and the heat exchanger, and the liquefied condensing agent handled by the condenser passes through the liquid storage device, the dryer, and the expansion valve in turn and then enters the cooling pipe.

Preferably, the hydrophobic material coating is a perfluoro ethyl vinyl ether (PEVE) coating with a rough surface.

Preferably, the ultrasonic generator has four ultrasonic vibrators; the ultrasonic vibrators are ferric ultrasonic vibrators, or steel ultrasonic vibrators, or titanium alloy ultrasonic vibrators; the ultrasonic vibrators are round, rectangular, or rhomboid.

Moreover, a seawater fluidized ice manufacturing method is provided, including the following steps:

S1, compressing the low-temperature and low-pressure condensing agent vapor in the ice-making barrel into high-temperature and high-pressure condensing agent vapor, and sending the high-temperature and high pressure condensing agent vapor into the condenser by the compressor, and condensing the condensing agent into liquid in the condenser;

S2 allowing seawater to enter the ice-making barrel and the condensing agent to enter the cooling pipe, improving the heat exchange efficiency through the nano-particles and foamed metal, and then condensing the seawater into fluidized ice;

S3, when the seawater is condensed in the ice-making barrel, generating ultrasonic waves at a frequency of 25 kHz and 40 kHz in the ice-making barrel using the ultrasonic generator to drive the seawater in the ice-making barrel to generate a cavitation effect and then to drive the seawater to crystallize into fluidized ice.

Preferably, in step S2 the seawater is filtered by the seawater purification module and then enters the ice-making barrel.

Preferably, in step S1 the condenser communicates with the seawater and condenses the high-temperature and high-pressure condensing agent vapor into liquid through the seawater.

Preferably, in step S2 the seawater passes through the liquid storage device, the dryer and the expansion valve in turn and then enters the cooling pipe.

Preferably, in step S2 the disturber disturbs the seawater when the seawater enters the ice-making barrel, thus increasing the turbulence level and promoting convection heat exchange.

Compared with the prior art, the present disclosure has the following beneficial effects:

1. The seawater fluidized ice manufacturing equipment has a high heat exchange efficiency, a relatively small volume, manufactures ice in a short time, and therefore achieves a good effect in use.

2. The seawater purification module can purify seawater to prevent the equipment from damage caused by excessive impurities in the seawater which is directly pumped from sea, and the fluidized ice made of the filtered seawater has a high quality.

3. The cooling pipe has a semi-round pipe structure, thus increasing the heat exchange efficiency; the semi-round pipe consumes fewer materials, occupies a small space, and can reduce the volume of the ice-making barrel; more space outside the semi-round pipe can be filled in with heat insulating materials to reduce heat exchange between the condensing agent and the outside world, and thus, the heat exchange area between the ice-making barrel and the cooling pipe is increased, and the condensing agent fully contacts the barrel wall, quickly brings seawater heat away and then promotes the seawater to form ice.

4. The added nano-particles strengthen the energy exchange among particles, and the temperature rise intensifies the Brownian movement of the nano-particles in the base fluid, so the probability of collision among particles increases, and energy exchange is also enhanced, thus promoting the improvement of the heat conduction capability of the nano-particles. In short, the efficiency of the evaporator is enhanced.

5. The geometrical structure of the foamed metal has a great influence on the boiling heat exchange feature of the condensing agent. For the foamed metal with the same porosity, as the aperture reduces, on the one hand, the specific area of the foamed metal increases to promote the heat exchange, and on the other hand, the foamed metal increasing strongly restrains air bubbling to play a good role in heat exchange.

6. The ultrasonic waves can improve the manufacture efficiency of the fluidized ice, and the manufactured seawater fluidized ice features round ice crystal particles, a tiny diameter, and convenient delivery, and cools aquatic products very quickly; and the ice manufacture process is continuous and enclosed, thus improving the cleanliness of the fluidized ice.

7. In terms of the surface adsorption of the ice crystals, weakening the bonding adhesion between the ice crystals and the equipment effectively solves the problem of adsorption blockage of the ice crystals in the fluidized ice manufacture process, thus effectively improving the ice manufacture efficiency of the equipment, saving energy consumption, and making the equipment run more smoothly.

BRIEF DESCRIPTION OF THE SEVERAL VIEWS OF THE DRAWINGS

FIG. 7 is a flowchart of a seawater fluidized ice manufacturing method of the present disclosure.

Figure 1:
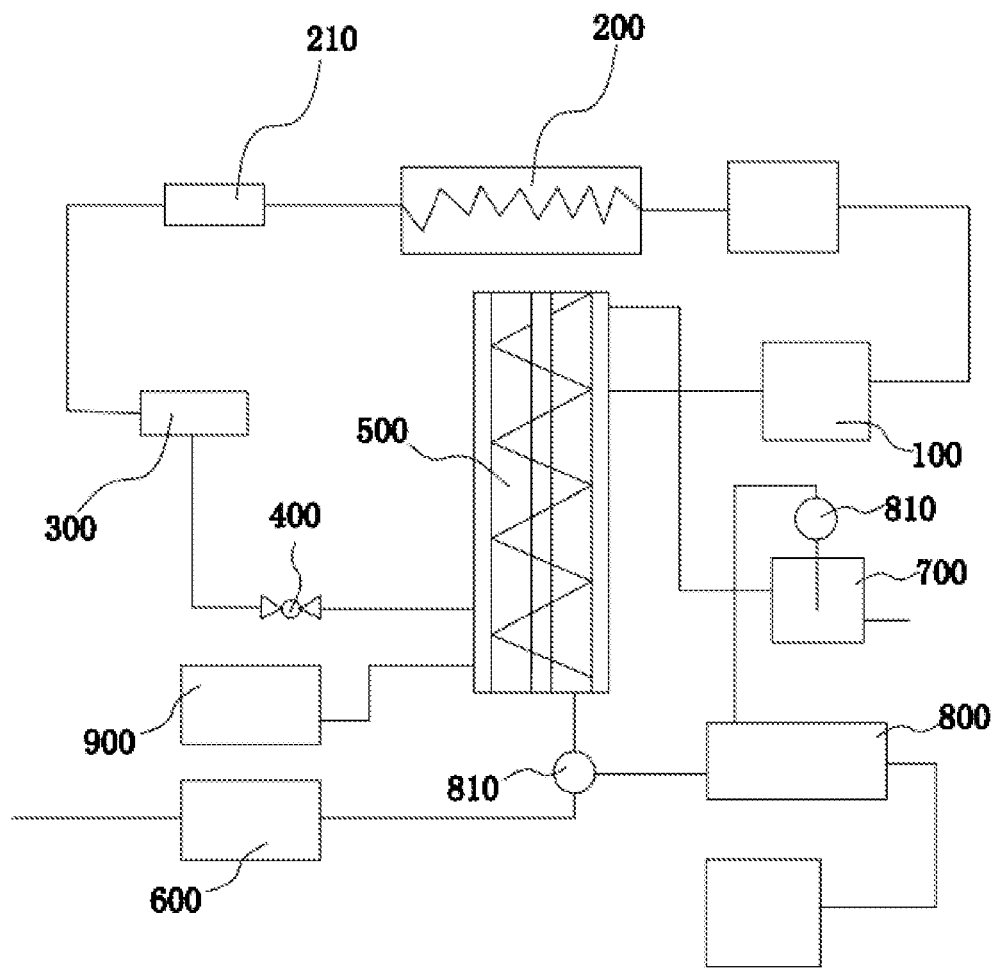
FIG. 1 is a schematic view of the seawater fluidized ice manufacturing equipment of the present disclosure.

As shown in the drawings: 100. compressor; 200. condenser; 210. liquid storage device; 300. dryer; 400. expansion valve; 500. heat exchanger; 510. ice-making barrel; 511. disturber; 520. cooling pipe; 521. foamed metal; 522. hydrophobic material coating; 600. seawater purification module; 700. insulating ice storage tank; 800 data sampler; 810. thermocouple; 900. ultrasonic generator.

DETAILED DESCRIPTION OF THE INVENTION

The present disclosure is described below in further detail in conjunction with the specific embodiments and attached drawings. However, the present disclosure is not limited to those embodiments.

Figure 2:
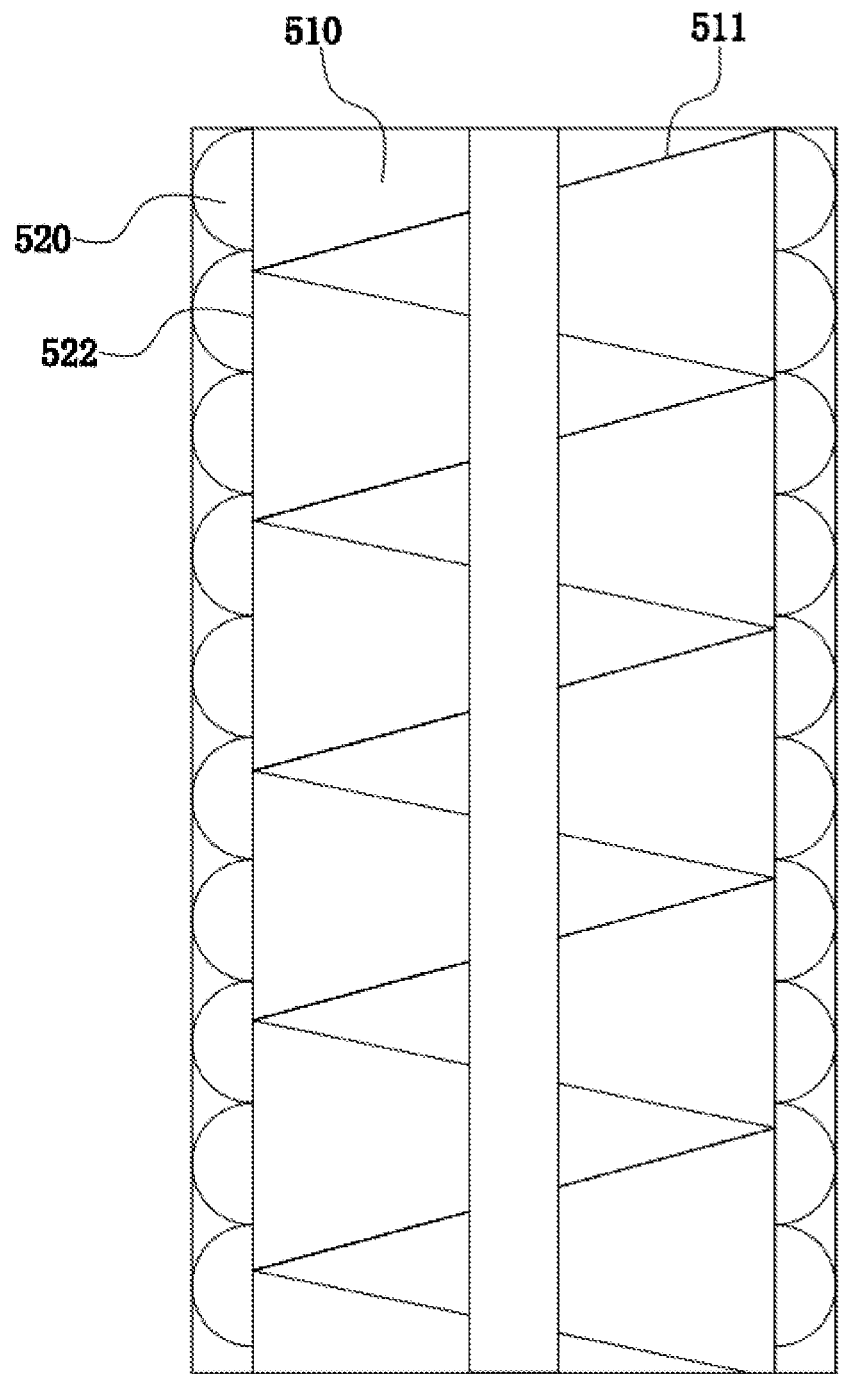
FIG. 2 is a structural view of a heat exchanger of the present disclosure.
Figure 3:
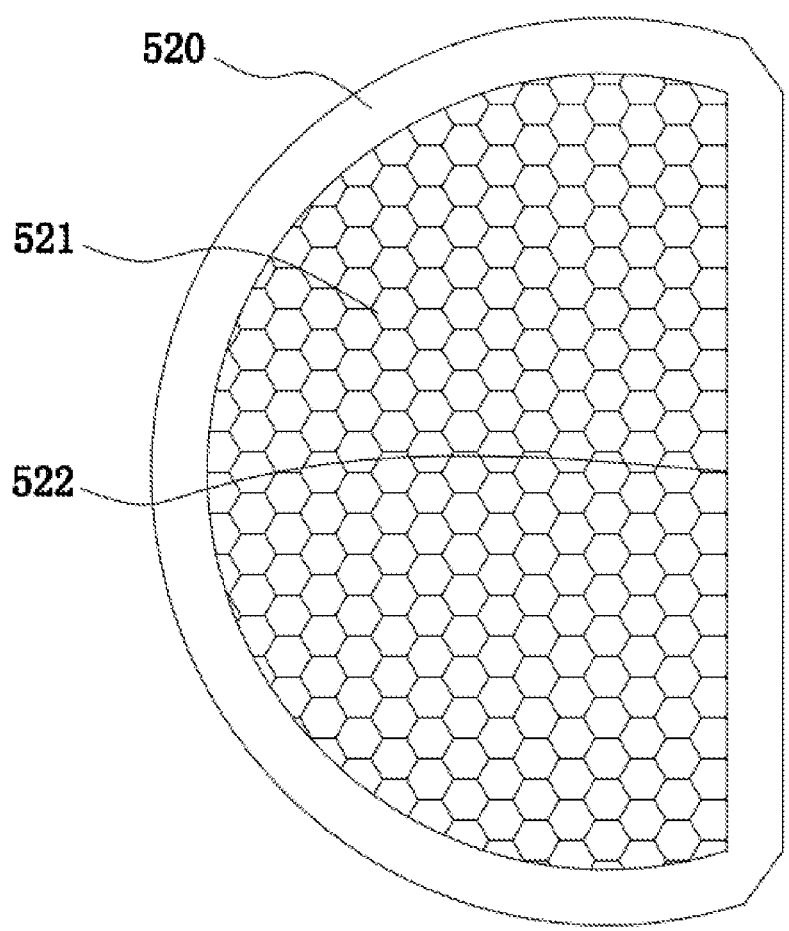
FIG. 3 is a structural view of a cooling pipe of the present disclosure.
Figure 4A:
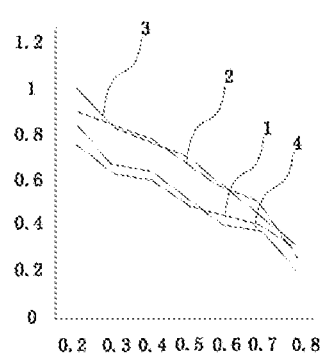
FIG. 4a is a line chart of the flowing and boiling heat exchange coefficient of a 50 mm test cross section, which is filled in with 5 pores per inch (PPI) foam filled metal copper, of the present disclosure.
Figure 4B:
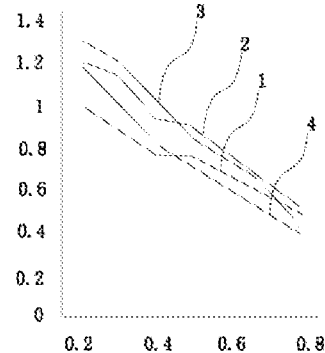
FIG. 4b is a line chart of the flowing and boiling heat exchange coefficient of a 100 mm test cross section, which is filled in with 5 PPI foam filled metal copper, of the present disclosure.
Figure 4C:
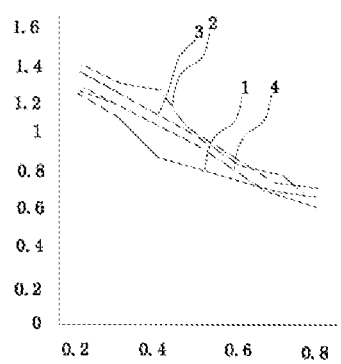
FIG. 4c is a line chart of the flowing and boiling heat exchange coefficient of a 150 mm test cross section, which is filled in with 5 PPI foam filled metal copper, of the present disclosure.
Figure 4D:
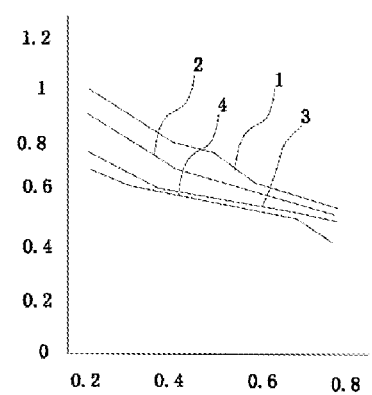
FIG. 4d is a line chart of the flowing and boiling heat exchange coefficient of a 50 mm test cross section, which is filled in with 10 PPI foam filled metal copper, of the present disclosure.
Figure 4E:
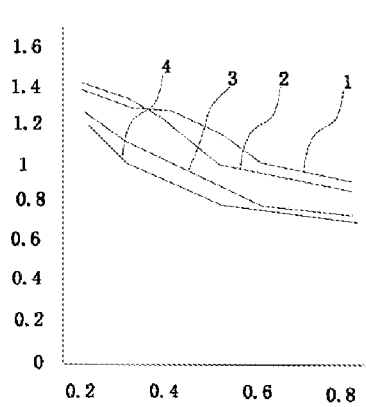
FIG. 4e is a line chart of the flowing and boiling heat exchange coefficient of a 100 mm test cross section, which is filled in with 10 PPI foam filled metal copper, of the present disclosure.
Figure 4F:
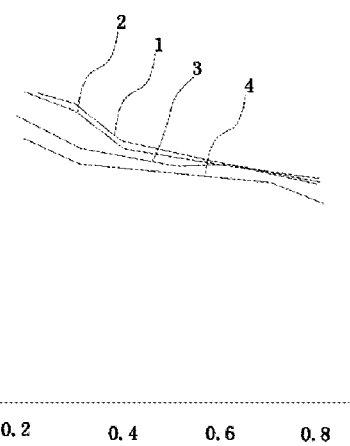
FIG. 4f is a line chart of the flowing and boiling heat exchange coefficient of a 150 mm test cross section, which is filled in with 10 PPI foam filled metal copper, of the present disclosure.
Figure 5A:
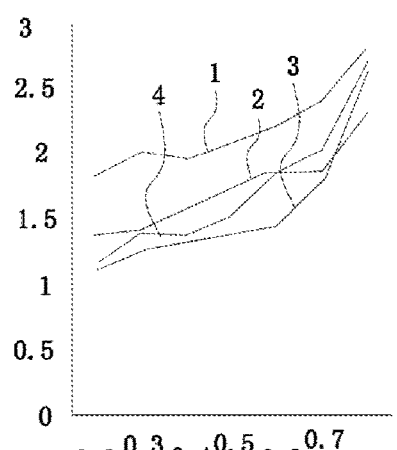
FIG. 5a is a data diagram of the effects of different foamed metal structures of the present disclosure on the effect factor of the foamed metal (EFMF), also represented as $EF_{MF}$.
Figure 5B:
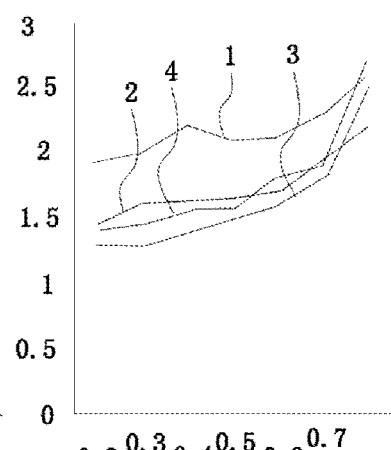
FIG. 5b is a data diagram of the effects of different foamed metal structure of the present disclosure on EFMF.
Figure 5C:
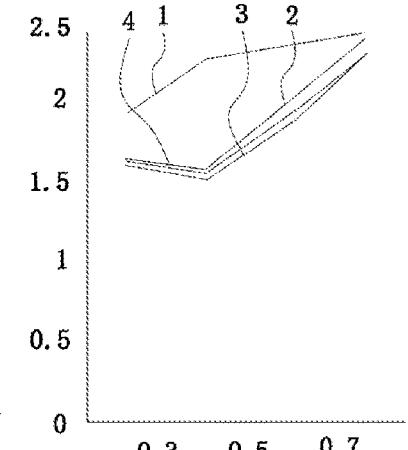
FIG. 5c is a data diagram of the effects of different foamed metal structure of the present disclosure on EFMF.
Figure 5D:
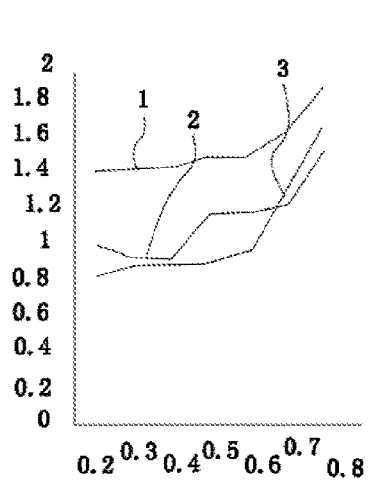
FIG. 5d is a data diagram of the effects of different foamed metal structure of the present disclosure on EFMF.
Figure 5E:
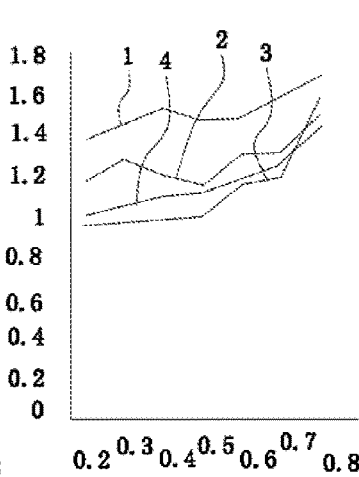
FIG. 5e is a data diagram of the effects of different foamed metal structure of the present disclosure on EFMF.
Figure 5F:
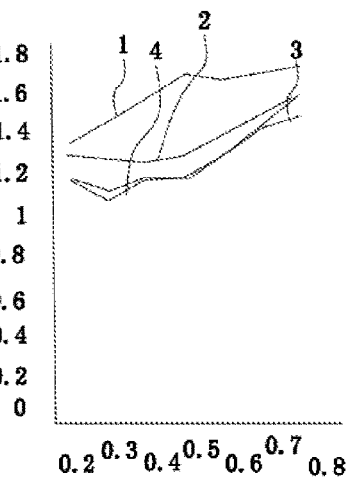
FIG. 5f is a data diagram of the effects of different foamed metal structure of the present disclosure on EFMF.

As shown in FIG. 1, FIG. 2, and FIG. 3, seawater fluidized ice manufacturing equipment is provided. In a refrigerating system of the seawater fluidized ice manufacturing equipment, a low-temperature and low-pressure condensing agent is first compressed by a compressor 100 to generate high-temperature and high-pressure condensing agent vapor, and the high-temperature and high-pressure condensing agent vapor is delivered into a condenser 200; the condenser 200 is internally provided with room temperature seawater as a cooling medium, so the heat of the condensing agent is exchanged to the cooling medium; at this time, the cooling agent vapor releases heat and is condensed into liquid; the condensing agent liquid is throttled, decompressed, and cooled, then enters an ice-making module and absorbs the heat of the seawater which is delivered into the ice-making module; the condensing agent is gasified and absorbed into the compressor 100; and thus, a refrigerating cycle is completed.

In the cycle, the compressor 100 compresses the low-temperature and low-pressure condensing agent into high-temperature and high-pressure condensing agent vapor.

The condenser 200 is connected with the compressor 100. The condenser 200 is internally provided with the cooling medium, and the high-temperature and high-pressure condensing agent vapor passes through the condenser 200 and then forms liquefied condensing agent. Further speaking, when the high-temperature and high-pressure condensing agent meets the low-temperature medium, its heat is exchanged with the cooling medium, and then the condensing agent is condensed into liquid from gas status, realizing the high-to-low-temperature conversion process.

The heat exchanger 500 can change the seawater into fluidized ice, and is connected with the condenser 200. The heat exchanger 500 communicates with the seawater, and the seawater is cooled by the low-temperature and low-pressure condensing agent to form fluidized ice. The specific working principle is as follows: the low-temperature liquefied condensing agent exchanges heat with the seawater, and then the seawater is cooled to form fluidized ice.

The heat exchanger 500 is provided with a hydrophobic material coating 522. More exactly speaking, the hydrophobic material coating 522 is positioned on the heat exchange face of the heat exchanger 500, and the hydrophobic material coating 522 can drive the surface ice thickness to unapparently increase as the time goes by. In short, an ice layer generated does not have a very large thickness, thus avoiding ice blockage.

Moreover, the heat exchanger 500 communicates with the seawater, and the seawater is cooled by the liquefied condensing agent to form fluidized ice.

Here, it should also be pointed out that the evaporator is actually the piping portion in the ice-making module, and to be exact, is the pipe of the condensing agent; to enhance the evaporator efficiency is to enhance the heat exchange efficiency of the condensing agent pipe; moreover, the equipment can enhance the heat exchange of a unit to fully condense the seawater, and also has the advantages of small volume and high heat exchange efficiency; besides, due to its small volume, the equipment is applicable to ocean fishing vessels.

The ultrasonic generator 900 is connected with the heat exchanger 500 to generate ultrasonic waves and transmit the ultrasonic waves into the heat exchanger 500, thus driving the seawater in the heat exchanger 500 to crystallize into ice.

The term "fluidized ice" is required to be understood; the "fluidized ice" is a solid-liquid two-phase solution containing suspended ice crystal particles, wherein the ice crystal particles are tiny, have a diameter of not greater than 1 mm, have strong fluidity, and can be delivered using a pump.

In use, the ultrasonic generator 900 is started first to transmit electric signals to an ultrasonic electric signal transmitter. Then, the ultrasonic electric signal transmitter transmits the electric signals to the ultrasonic vibrators. After receiving the electric signals, the ultrasonic vibrators send ultrasonic waves to perform relevant operations.

By the effect of the ultrasonic waves, the seawater solution generates a pulling stress inside to form a negative pressure, the drop of pressure urges gases dissolved in the solution to be excessively saturated and then the gases escape from the liquid and become cavitation bubbles. The liquid itself also contains some tiny bubbles. The generated and originally existing bubbles provide the seawater with nuclei and promote the seawater to crystallize into ice. Besides, all of those bubbles generate vibration by the effect of the ultrasonic waves. When the sound pressure reaches a certain value, bubbles expand quickly and then suddenly close, and an impact wave is generated at the moment when the bubbles close. A series of dynamic processes including expansion, closing and vibration are called ultrasonic cavitation effect. The ultrasonic cavitation effect breaks the original balance, eliminates the degree of supercooling and effectively promotes the generation of the seawater fluidized ice.

Besides, the cavitation effect generated by the ultrasonic waves also obviously disturbs the flow status of the ice-making refrigerant such that a turbulent flow is generated. The generated turbulent flow can enhance the efficiency of heat exchange between the refrigerant and the seawater, enhance the heat exchange amount, and further promote the generation of seawater fluidized ice.

In the manufacture process of the seawater fluidized ice, the ultrasonic generator 900, the ultrasonic electric signal transmitter and the ultrasonic vibrators are required to be started and kept working to maintain the generation of the ultrasonic waves, realizing continuous production of the seawater fluidized ice. After ice-making is ended, the relevant devices are required to be turned off in time.

As shown in FIG. 1 and FIG. 2, on the basis of the above embodiment, the heat exchanger 500 includes an ice-making barrel 510 and a cooling pipe 520, wherein the cooling pipe 520 is a semi-round copper pipe, the cooling pipe 520 closely fits the outer wall of the ice-making barrel 510, the ice-making barrel 510 is connected with a seawater purification module 600, the cooling pipe 520 receives the condensing agent and enables the seawater in the ice-making barrel 510 to crystallize into fluidized ice;

The seawater purification module 600 can purify seawater and prevent the equipment from damage caused by excessive impurities in the seawater which is directly extracted from sea, and the fluidized ice manufactured by filtered seawater has a high quality.

Moreover, the cooling pipe 520 can also be externally covered with an insulating layer, thus avoiding loss of the cold energy, further preventing exchange between the external heat and the condensing agent.

The heat exchanger 500 is an important part which affects the heat exchange efficiency. Low heat exchange efficiency is a common problem in the current manufacture of fluidized ice. When an ice maker runs for a long time, the heat exchanger 500 has a small heat exchange amount, a large heat loss and high energy consumption. Therefore, an efficient heat exchanger 500 with a large heat exchange amount is in urgent need. The heat exchanger 500 in this embodiment is preferably a jacket type heat exchanger 500 or a sleeve type heat exchanger 500.

All existing cooling pipes 520 are round pipes. The cooling pipe is a common heat exchange device which has a simple structure, is conveniently manufactured, installed, cleaned and maintained, is particularly applicable to cooling/condensing of the high-pressure fluid, and therefore is the mainstream of the modern market. In the fluidized ice manufacturing equipment, the round pipe externally surrounds the ice-making barrel 510, and the round pipe is filled in with the condensing agent.

Through contact between the pipe wall and the round pipe, the heat in the seawater is evaporated, absorbed and brought away by the condensing agent. The heat exchange between the seawater and the condensing agent proceeds in the natural convection mode, so the heat exchange coefficient is low; moreover, the area of the round pipe contacting with the ice-making barrel 510 is very small, and when the contact area is expanded, the contact area can be almost regarded as a straight line.

In this embodiment, the cooling pipe 520 has a semi-round pipe structure, thus increasing the heat exchange efficiency; the semi-round pipe consumes fewer materials, occupies a small space, and can reduce the volume of the ice-making barrel 510; more space outside the semi-round pipe can be filled in with heat insulating materials to reduce heat exchange between the condensing agent and the outside world, and thus, the heat exchange area between the ice-making barrel and the cooling pipe 520 is increased, and the condensing agent fully contacts the barrel wall, quickly brings seawater heat away, and then promotes the seawater to ice.

In the comparative calculation of the smooth round pipe and the semi-round pipe, the evaporation pressure is set as 995.0 kpa, the mass flux is set as 10.0-30.0 kg/(cm²·s), the heat flux is set as 3.1-9.3 kW/m², and the entry dryness is 0.2-0.8. The round steel pipe has a diameter d, a length L and an area $A_1$. The semi-round steel pipe has a diameter d, a length L and an area $A_2$.

In the process that the steel copper pipe contacts the pipe wall, the actual contact area is $A_3=0.1A_1$. Known factors include: heat conductivity coefficient of copper: $\lambda_1=400.0$ W/(m·k); heat conductivity coefficient of iron: $\lambda_2=80.0$ W/(m·k); heat conductivity coefficient of air: $h_2=5.0$ W/(m²·k); boiling heat exchange coefficient of the pure refrigerant in the round pipe: $h_1$; boiling heat exchange coefficient of the pure refrigerant in the semi-round pipe: $h_2$; heat exchange coefficient of seawater: $h_3=4000$ W/(m²·k); heat exchange amount between the round pipe and the wall surface: $\Phi_1$; heat exchange amount between the semi-round pipe and the wall surface: $\Phi_2$; seawater temperature $t_1$: 20.0° C.; and refrigerant temperature $t_2$: −20.0° C.

$$h_1 = \frac{q_1}{(t_w - t_{sat})}$$

$$h_2 = \frac{q_2}{(t_w - t_{sat})}$$

$$q_1 = 5 \text{ W/m}^2$$

$$q_2 = 6.1 \text{ W/m}^2$$

$$t_w = -15° \text{ C.}$$

$$t_{sat} = -35° \text{ C.}$$

$$\Rightarrow h_1 = \frac{5}{20} \Rightarrow h_2 = \frac{61}{200}$$

$$\Phi_1 = \frac{t_2 - t_1}{\left(\frac{1}{h_1} + \frac{1}{h_2} + \frac{1}{h_3} + \frac{1}{\lambda_2}\right)} A_2 + \frac{t_2 - t_1}{\left(\frac{1}{h_1} + \frac{1}{h_2} + \frac{1}{h_3} + \frac{1}{\lambda_2}\right)} A_3 = 65.2 A_2$$

$$\Phi_2 = \frac{t_2 - t_1}{\left(\frac{1}{h_1} + \frac{1}{h_2} + \frac{1}{h_3} + \frac{1}{\lambda_1}\right)} A_2 = 100 A_2$$

$$\Rightarrow \frac{\Phi_1}{\Phi_2} \approx 1.5$$

Through comparative calculation it is found that the heat exchange amount of the semi-round pipe is 1.5 times that of the round pipe. On this basis, the pipe is internally provided with 10 PPI foam metal 521 which can increase the heat exchange coefficient; the added nano-fluid can strengthen the heat exchange effect, and as the nano-fluid concentration increases, the heat exchange effect gets better; and such strengthening effect is more obvious in a pipe with the foam metal 521, wherein the heat amount is increased by 180%, and the heat exchange efficiency is enhanced by 200%.

Regarding the heat exchange model of the heat exchanger 500, assuming that the flat wall area is A, a hot fluid on one side, and a cold fluid on the other side, so the heat exchange coefficients of the surfaces on two sides are $h_1$ and $h_2$, the wall has a heat conductivity coefficient of $\lambda_1$ and a thickness of $\delta_1$; if the flat wall is added with the copper pipe, the thickness is $\delta_2$ and the heat conductivity coefficient is $\lambda_2$. In such circumstances, the exchanged heat amount is calculated.

The wall surface temperatures are $t_{w1}$ and $t_{w2}$.

$\phi_{flat\ pipe}$: $q=(t_{f1}-t_{f2})$—The hot fluid is exchanged to the left side of the wall in a convection heat exchange mode.

$q=h_2(t_{w2}-t_{f2})$—Heat conduction equation for fluid through the wall surface $$q = \frac{\lambda_1}{\delta_1}(t_{w1} - t_{w2})$$

On the right side of the wall, the heat is exchanged to the cold fluid in a convection mode.

In a steady-state situation, the heat flux q in the three equations is equal.

$$t_{f-1} t_w = \frac{q}{h^1}$$

$$t_w - t_{w1} = \frac{q \delta_1}{\lambda_1}$$

$$t_w - t_{f22} = \frac{q}{h_2}$$

Sort $$q = \frac{(t_{f1} - t_{f2})}{\frac{1}{h_1} + \frac{\delta_1}{\lambda_1} + \frac{1}{h_2}} = k_1(t_{f1} - t_{f2})$$

$$\phi_1 = qA = k_1(t_{f1} - t_{f2})$$

Copper pipe added $$k_2 = \frac{1}{h_1} + \frac{\delta_1}{\lambda_1} + \frac{1}{h_2} + \frac{\delta_2}{\lambda_2}$$

$$\phi_2 = k_2 A(t_{f1} - t_{f2})$$

Namely $k_2 \ll k_1$ $\phi_1 \gg \phi_2$.

It is thus known that the heat exchange amount of the jacket type heat exchanger 500 is far greater than that of the sleeve type heat exchanger 500.

The wall surface of the jacket type heat exchanger 500 is relatively rough than that of the smooth round pipe, and the rough wall surface increases the turbidity of the fluid on the wall area and reduces the thickness of the bottom layer of the laminar flow. When the height of the rough element exceeds the thickness of the bottom layer of the laminar flow, the convection heat exchange gets more obvious. The thickness of the bottom layer of the laminar flow is very small, only about 3.0 mm, so various sand-type rough surfaces work well. If machined with grooves in various shapes and various dimensions, the solid surface is roughed, and a better effect can be achieved.

As shown in FIG. 2 and FIG. 3, on the basis of the above embodiment, the cooling pipe 520 is internally provided with nano-particles and foamed metal 521; the nano-particles enhance energy exchange in a refrigerant, and the foamed metal 521 improves the efficiency of heat exchange between the condensing agent and the seawater.

The nano-particles are metallic or non-metallic nano-particles dispersed in the traditional heat exchange medium (water, alcohol, oil, or other mediums) to form a homogeneous and stable novel heat exchange working medium with relatively high heat conduction performance.

In 1995, Choi from the national laboratory Argonne of the USA, initially put forward the concept of "nano-fluid". In comparison with the heat conductivity coefficient of liquid, solid particles have a far larger heat conductivity coefficient. Therefore, the heat conductivity coefficient and the convection heat exchange performance of the working medium added with the nano-particles are obviously enhanced.

The nano-particles perform phase change in the condensing agent pipe, realizing exchange of heat. Regarding the boiling heat exchange mechanism of the nano-fluid, the heat exchange enhancement effect refers to the nano-particles added in the fluid having the ability to enhance energy exchange in the liquid and then enhance the boiling heat exchange performance of the nano-particles.

Usually, in comparison with the traditional heat conducting fluid, the nano-particles have a higher heat conductivity coefficient; the added nano-particles strengthen the energy exchange among particles, and the temperature rise intensifies the Brownian movement of the nano-particles in the base fluid, so the probability of collision among particles increases, and energy exchange is also enhanced, thus promoting the improvement of the heat conduction capability of the nano-particles; besides, the heat conductivity of the nano-particles is higher than that of water, which also enhances the heat conduction performance of the nano-fluid.

Figure 6A:
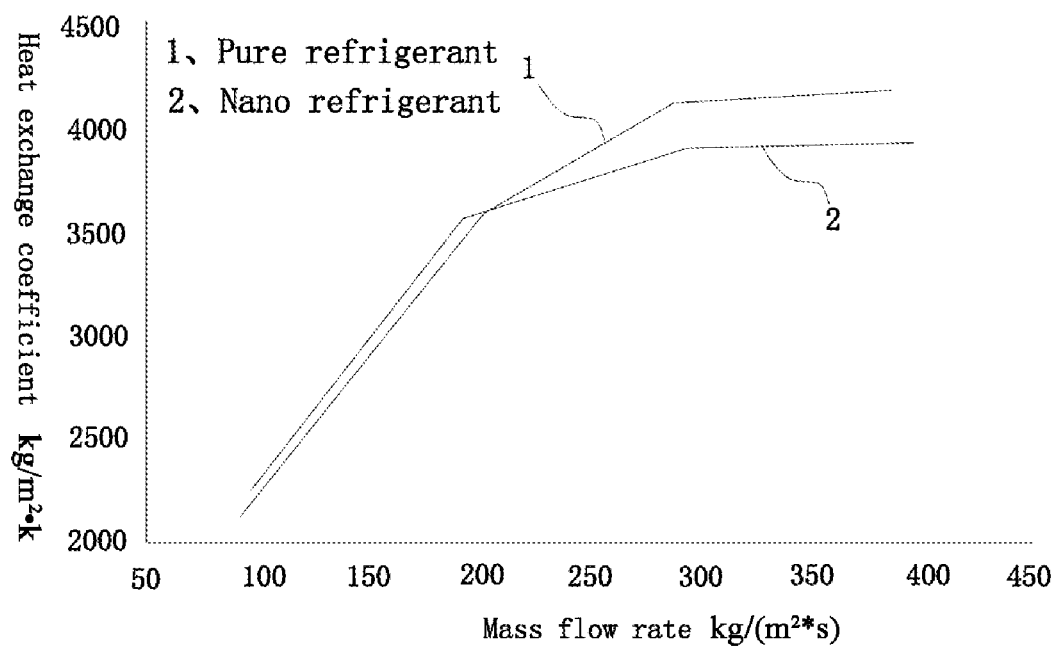
FIG. 6a is a comparison diagram of the heat exchange coefficients of two refrigerants of the present disclosure.

FIG. 6a shows the relation between the heat exchange coefficient and the flow when heat fluxes of the two refrigerants are both 15.0 kW/m$^2$. The heat exchange coefficients of the two refrigerants increase as the flow increases. At a low mass flow rate in a range of 95.7-191.5 kg/(m$^2$*s), the heat exchange coefficients of the two refrigerants are equivalent, wherein the heat exchange coefficient of the nano-preparation is a little bigger than the heat exchange coefficient of the pure refrigerant; however, at a high mass flow rate in a range of 287.2~382.9 kg/(m$^2$*s), the heat exchange coefficient of the nano-preparation is gradually lower than that of the pure refrigerant, and the difference enlarges as the mass flow rate increases. The effective heat conductivity coefficient of the nano-particle suspension is greatly enhanced compared to the effective heat conductivity coefficient of the base fluid. The added particles reduce the surface tension of the liquid, reduce the boiling degree of superheating, and therefore promote heat exchange in the liquid. The added nano-particles reduce the surface tension of the liquid, and therefore reduce the boiling degree of superheating and enhance the boiling heat exchange coefficient in the liquid.

Figure 6B:
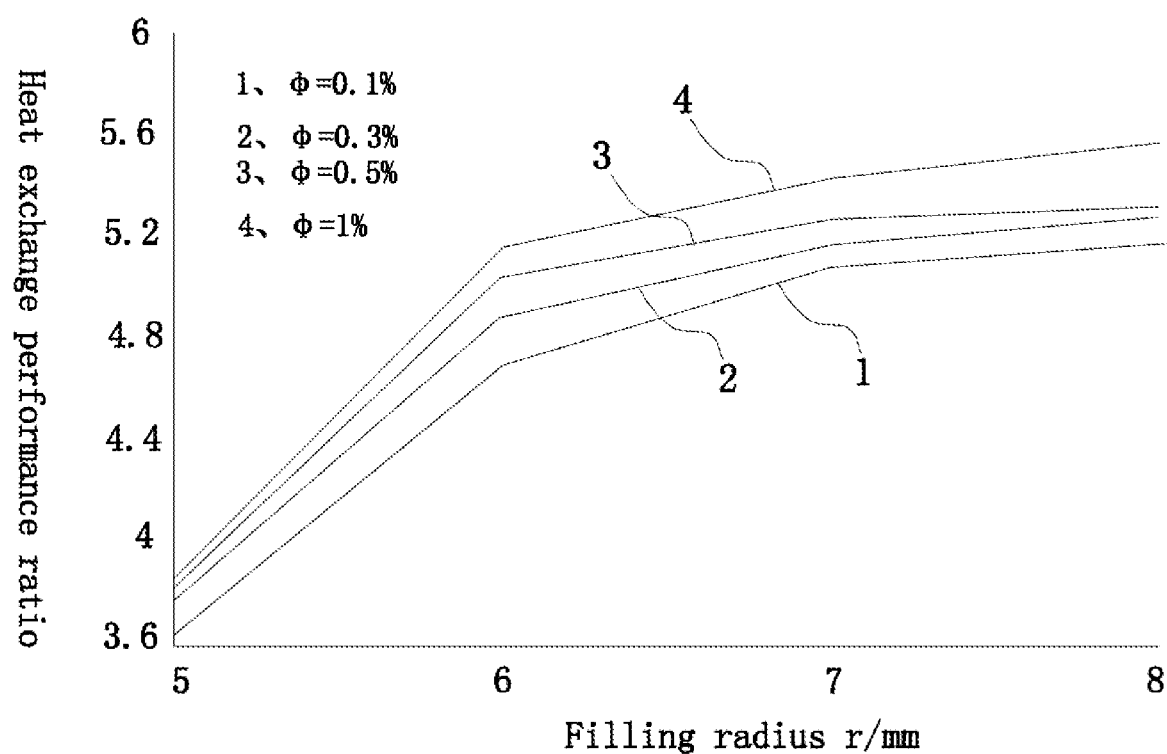
FIG. 6b is a comparison diagram of the relation between nano-fluid concentration and heat exchange performance of the present disclosure.

FIG. 6b shows the relation between the concentration of the nano-fluid and the heat exchange performance. When the volume fraction increases from 0.1% to 1.0%, the heat exchange performance of the nano-fluid is increased on average by 18.9%, 24.4%, and 28.3% in comparison with the common base fluid. The specific surface area of the nano-fluid on the foamed metal 521 increases as the filling ratio increases. Under the conditions of fixed porosity, the increment of the filling ratio of the foamed metal 521 intensifies the heat exchange between the fluid and solid. Moreover, the specific heat capacitance reduces while the volume concentration of the nano-particles increases and the heat conductivity of the nano-fluid rises, generally enhancing the heat diffusivity; as the Brownian movement of the nano-particles gets more intense, the fluid disturbance in the area of the foamed metal 521 increases such that the heat exchange intensity and heat exchange rate of the fluid in the area of the foamed metal 521 increase, and the heat conductivity increases.

As shown in FIG. 1, FIG. 2, and FIG. 3, on the basis of the above embodiment, the cooling pipe 520 is internally provided with the foamed metal 521, and the foamed metal 521 improves the efficiency of heat exchange between the condensing agent and the seawater.

The foamed metal 521 is preferably foamed metallic copper 521. Here it should be pointed out that the best effect is achieved when the cooling pipe 520 is filled in with 10 PPI foamed metallic copper 521.

In the process of testing the influences of the foamed metallic copper 521 on the heat exchange feature, the test object is two copper pipes filled in with foamy copper.

Each one of the copper pipes has an inner diameter of 23.4 mm and a wall thickness of 1.0 mm, and the portion where the foamy copper is filled in is 200.0 mm long. The embedded foamy copper is respectively 5 PPI foamy copper with a 90% porosity, and 10 PPI foamy copper with a 90% porosity; a thin layer of copper-based amorphous solder is disposed between the inner wall of each one of the pipes and the foamy copper to reduce the contact thermal resistance between the inner wall and the foamy copper as much as possible; the outer face of each one of the copper pipes is externally wound with an electric heating tape for providing heat as required by the test segment during the experiment; the electric heating tape is externally coiled with glass cotton, rubber, and a gas insulating tape in turn to realize thermal insulation to the environment; thermocouples 810 for measuring the wall temperature are arranged on three cross sections that are respectively located at the 50.0 mm, 100.0 mm and 150.0 mm positions of the test segment, and three electrocouples 810 are respectively arranged at the top, middle and bottom of each one of the cross sections.

The refrigerant used in the experiment is R410A, and the lubricating oil is VG68. The experiment conditions are as follows: evaporation pressure: 995.0 kPa; mass flux: 10.0~30.0 kg/m$^2$·k; heat flux: 3.1~9.3 kW/m$^2$; entry dryness: 0.2~0.8; oil concentration: 0~5.0%.

FIGS. 4a, 4b, 4c, 4d, 4e and 4f show the laws by which the flowing and boiling heat exchange coefficient of the refrigerant-lubricating oil mixture varies with the dryness and the mass flux in the test segments of pipes that are respective filled in with the 5 PP foamy copper and 10 PPI foamy copper.

It can be seen that, for any mass flux and lubricating oil concentration of every test segment, the flowing and boiling heat exchange coefficient increases as the dryness reduces; for a round pipe test segment which is filled in with the foamed metal 521, the flowing and boiling heat exchange coefficient reduces as the lubricating oil concentration rises under the condition of the same mass flux and dryness. This phenomenon is jointly affected by the two actions of the lubricating oil on the boiling flow in the pipe: (1) Due to the existence of the lubricating oil, the adhesion and surface tension of the liquid-phase refrigerant are enhanced, resulting in an increase in the departure diameter and departure frequency of the bubbles, worsening the nuclear-state boiling heat exchange of the liquid-phase refrigerant, in particular the nuclear-state boiling heat exchange in the foamed metal 521, thus further worsening the flowing and boiling heat exchange. (2) Due to the existence of the lubricating oil, the surface tension of the liquid phase is enhanced, and the contact area between the liquid phase and the solid wall surface is enlarged, thus intensifying the flowing and boiling heat exchange. Under the condition that the pipe is filled in with the foamed metal 521, the first action plays the leading role, and the heat exchange coefficient reduces as the lubricating oil concentration rises.

From FIGS. 5a, 5b, 5c, 5d, 5e and 5f it is known that, in order to evaluate the influences of the foamed metal structure 521 on the flowing and boiling heat exchange feature in a quantitative manner, the ratio of the flowing and boiling heat exchange coefficient ($h_{MF, tp, r, o}$) of a refrigerant-oil mixture in a heat exchange pipe which is filled in with the foamed metal 521 to the heat exchange coefficient ($h_{smooth, tp, r,o}$) in a light tube under the same working conditions is defined as the effect factor $EF_{MF}$ of the foamed metal 521 $EF_{MF}=h_{MF, tp, r, o}/h_{smooth, tp, r,o}$ It can be seen that, in the pure refrigerant case, the EFMF is 1.3-1.9 (5 PPI) and 1.8-2.9 (10 PPI) respectively, representing that the two foamed metals 521 both enhance the flowing and boiling heat exchange of the refrigerant in the pipe, and the enhancement effects under the condition of high mass flux are better than that under the condition of low mass flux [12]. When the refrigerant is mixed with the lubricating oil, the EFMF is all smaller than the EFMF of the pure refrigerant under the same working conditions, representing that the two foamed metals 521 achieve weakened effects on enhancing the flowing and boiling heat exchange of the refrigerant. For the 5 PPI foamed metal 521, in the case of middle-and-low mass flux and in the case of high mass flux and high dryness, the EFMF is all smaller than 1.0 and reaches a minimum of 0.7 under some working conditions, representing that the existence of the foamed metal 521 worsens the flowing and boiling heat exchange of the refrigerant; for the 10 PPI foamed metal 521, the EFMF is greater than 1.0 and reaches a minimum of 1.1 under all working conditions, representing that the existence of the foamed metal 521 enhances the flowing and boiling heat exchange of the oil-contained refrigerant. The main worsening cause is that due to the existence of the foamed metal 521, the lubricating oil imposes a more obvious action on worsening the flowing and boiling heat exchange of the refrigerant, and such action is more obvious in the case of the low PPI foamed metal 521 and in the case of low mass flux. Under the same conditions, the EFMF of the 10 PPI foamed metal 521 is greater than that of the 5 PPI foamed metal 521, and is enhanced by 160%. The main cause is that the foamed metal 521 with a smaller aperture has a larger specific surface area and provides a bigger heat exchange area, thus promoting heat exchange; and the smaller aperture generates bigger damage on the turbulence flow and boundary layer of the fluid, thus promoting heat exchange. Besides, it can also be found out that, for any mass flux, the EFMF under the oil-contained condition decreases in comparison with that under the pure working conditions, and the reduction of the 10 PPI foamed metal 521 is smaller that of the 5 PPI foamed metal 521. The main cause is that, the 10 PPI foamed metal 521 has a smaller aperture and more obvious capillarity, has a bigger wet area in comparison with the 5 PPI foamed metal 521, and therefore weakens the heat exchange worsening effect of the lubricating oil.

The geometrical structure of the foamed metal 521 has a great influence on the boiling heat exchange feature of the condensing agent. For the foamed metal 521 with the same porosity, as the aperture reduces, on the one hand, the specific area of the foamed metal 521 increases to promote the heat exchange, and on the other hand, the foamed metal 521 increasing strongly restrains air bubbling to play a good role in heat exchange.

The foamed metal 521 is added into the condensing agent pipe to enhance the boiling heat exchange feature; nanoparticles are added into the condensing agent; and the round metal pipe is changed into a semi-round shape to enlarge the heat exchange area. The above three methods can all improve the heat exchange performance of the heat exchanger 500 to some degree.

As shown in FIG. 1, on the basis of the above embodiments, an insulating ice storage tank 700 which is connected with the heat exchanger 500 is also included; the fluidized ice manufactured by the heat exchanger 500 is delivered into the insulating ice storage tank 700 for storage. In this way, the fluidized ice can be conveniently seized and can also be prevented from melting.

As shown in FIG. 2, on the basis of the above embodiment, the inner wall of the ice-making barrel 510 is provided with a disturber 511, and the cold and hot fluids directly exchange heat between each other.

The mechanism for enhancing the convection heat exchange is as follows. When the fluid flows through the disturber 511, eddies with different intensities and different volumes are generated, which damage the boundary layer and greatly reduce the thermal resistance, so the cold and hot fluids directly exchange heat, and the heat exchange amount is greatly increased.

When the boundary layer grows and thickens again, another flow disturbing device comes and damages the boundary layer, so the entire convection heat exchange is enhanced.

The disturber 511 disposed on the wall surface, for example a helical baffle, can enhance the turbidity, and generates radial flows to drive mixing of the cold and hot fluids and make the fluid temperature uniform, thus enhancing the convection heat exchange.

In particular, laminar flows tend to enter the turbulence state, and the effect is better. The flow disturbing device placed in the fluid increases the heat exchange area, so the temperature of the disturber 511 also rises by the radiation effect of the pipe wall, thus enhancing convection heat exchange and achieving extra effects.

As shown in FIG. 1, on the basis of the above embodiments, a liquid storage device tank 210, a dryer 300 and an expansion valve 400 are disposed between the condenser 200 and the heat exchanger 500; the liquefied condensing agent handled by the condenser 200 passes through the liquid storage device 210, the dryer 300 and the expansion valve 400 in turn and then enters the cooling pipe 520, wherein the liquid storage device 210 stores the liquefied condensing agent, the dryer 300 absorbs moisture in the condensing agent, and the expansion valve 400 performs throttling and reduces pressure.

As shown in FIG. 1, on the basis of the above embodiments, a data sampler 800 is also included; the data sampler 800 is connected with thermocouples 810; and the thermocouples 810 are disposed in the insulating ice storage tank 700 for measuring the temperature of the fluidized ice.

The thermocouples 810 can measure the temperature of the fluidized ice and therefore monitor the temperature in real time. Once abnormal temperature is measured, the thermocouples 810 can send a notice in time. Moreover, the working situations of the equipment can be seen from the temperature of the fluidized temperature.

As shown in FIG. 2 and FIG. 3, on the basis of the above embodiments, the hydrophobic material coating 522 is a PEVE coating with a rough surface.

The roughness of the hydrophobic material coating 522 is better limited in the range of 0.1-1.6 mm; and excessively high roughness can form physical obstacles to ice crystals to lower the anti-blocking effect.

The contact angle of the hydrophobic material coating 522 can include, but be not limited to any one of the following angles: 91°, 93°, 97°, 100°, 107°, 115°, 120°, 127°, 135°, 140°, 130°, 148°, 150°, 155°, 160°, 165°, 170°, 173°, etc.

The water contact angle of the hydrophobic material coating 522 PEVE is preferably 109.2°. When the equipment continuously manufactures ice for 30 min, no frost appears; when the equipment continuously manufactures ice for 120 min, frost appears; after the equipment continuously manufactures ice for 150 min, a 1 mm thick ice layer is formed, and the thickness of the ice layer is not apparently increased as the time goes by.

As shown in FIG. 1, on the basis of the above embodiments, the ultrasonic generator 900 has four ultrasonic vibrators; the ultrasonic vibrators are ferric ultrasonic vibrators, or steel ultrasonic vibrators, or titanium alloy ultrasonic vibrators; the ultrasonic vibrators are round, rectangular or rhomboid.

Regarding the materials of the ultrasonic vibrator, the performance of the ultrasonic waves varies with the materials of the ultrasonic vibrators.

Mainly researched ultrasonic vibrator materials include ferric ultrasonic vibrators, steel ultrasonic vibrators and titanium alloy ultrasonic vibrators. From comparative tests it is found that the ferric ultrasonic vibrator has a good transmission efficiency, but low material strength, and tends to crack and generate a slippery screw hole; the steel ultrasonic vibrator has high strength, but has a relatively large sound impedance; and the titanium alloy ultrasonic vibrator has good comprehensive performance. Therefore, the ferric ultrasonic vibrator is selected as the final ultrasonic wave generator.

Regarding the number of the ultrasonic vibrators, the ultrasonic waves may interfere with each other if the number of the vibrators is large; and the ultrasonic waves may fail to meet the requirements for manufacturing seawater fluidized ice if the number of the vibrators is too small. The number can be 3, 4 or 5. Four ultrasonic vibrators can completely meet the requirements of the equipment.

As shown in FIG. 7, a seawater fluidized ice manufacturing method also is provided, including the following steps:

S1, compressing the low-temperature and low-pressure condensing agent vapor in the ice-making barrel 510 into high-temperature and high-pressure condensing agent vapor, and sending the high-temperature and high pressure condensing agent vapor into the condenser 200 by the compressor 100, and condensing the condensing agent into liquid in the condenser 200;

S2 allowing seawater to enter the ice-making barrel 510 and the condensing agent to enter the cooling pipe 520, improving heat exchange efficiency through the nano-particles and foamed metal 521, and then condensing the seawater into fluidized ice;

S3, when the seawater is condensed in the ice-making barrel 510, generating ultrasonic waves at a frequency of 25 kHz and 40 kHz in the ice-making barrel 510 by the ultrasonic generator 900 to drive the seawater in the ice-making barrel 510 to generate a cavitation effect and then to drive the seawater to crystallize into fluidized ice.

The foamed metal 521 is added into the refrigerant pipe to enhance the boiling heat exchange feature; nano-particles are added into the refrigerant; and the round metal pipe is changed into a semi-round shape to enlarge the heat exchange area. The above three methods can all improve the heat exchange performance of the heat exchanger 500 to some degree. 1) In the pure refrigerant case, the existence of the foamed metal 521 enhances the flowing and boiling heat exchange, and the heat exchange coefficient is improved by 185% at maximum; 2) in the oil-contained case and under the condition of low mass flux, the heat exchange of the oil-contained refrigerant is worsened because of the existence of the foamed metal 521, and the heat exchange coefficient is reduced by 30% at maximum; 3) under the same working conditions, a smaller aperture can enhance the flowing and boiling heat exchange coefficient, and in comparison with the 5 PPI foamed metal 521, the 10 PPI foamed metal 521 can enhance the heat exchange coefficient by 160%.

During the cooling process, the seawater solution influenced by the low-frequency ultrasonic waves tends to form solute crystal nuclei, the crystallization rate is higher and temperature drop rate is lower in the crystallization process; with the effects of the ultrasonic waves, the crystallization rate of the seawater solution can be enhanced, and the vibration of the solution molecules in the sound field can shorten the crystallization starting time of the seawater solution in comparison with the cavitation effect, which means that the ultrasonic cavitation effect is a main factor for speeding up the crystallization of the seawater solution; the ultrasonic waves of different frequencies generate unapparent influences on the crystal size, but generate very obvious influences on the degree of supercooling of the seawater solution, wherein the crystallization rate is higher, and the temperature drop rate is lower in the crystallization process; the ultrasonic waves of different power generate unapparent influences on the crystal size, but generate very obvious influences on the degree of supercooling when the seawater is crystallized (maximum up to 8.3° C.).

In this way, fluidized ice can be manufactured in a short time, ice-blockage is avoided, and good effects are achieved in use.

In Step S2, the seawater is filtered by the seawater purification module 600 and then enters the ice-making barrel 510; the seawater purification module 600 can purify seawater, prevent the equipment from damage caused by excessive impurities of the seawater which is directly extracted from sea, and the fluidized ice manufactured from filtered seawater has a high quality.

In step S1, the condenser 200 communicates with the seawater and condenses the high-temperature and high-pressure condensing agent vapor into liquid through the seawater. The seawater used as the cooling medium is easily accessible and economical. The seawater can be directly obtained.

Preferably, in step S2 the seawater passes through the liquid storage device 210, the dryer 300 and the expansion valve 400 in turn and then enters the cooling pipe 520.

The liquid storage device 210 stores the liquefied condensing agent, and the liquefied condensing agent stored in the liquid storage device can be fetched at any time.

The dryer 300 absorbs moisture in the condensing agent to keep the purity of the condensing agent, and the expansion valve 400 performs throttling and reduces pressure.

In step S2 the disturber 511 disturbs the seawater when the seawater enters the ice-making barrel 510, thus increasing turbulence level and promoting convective heat exchange.

The disturber 511 disposed on the wall surface, for example a helical baffle, can enhance the turbidity, and generate radial flows to drive mixing of the cold and hot fluids and make the fluid temperature uniform, thus enhancing the convection heat exchange.

In particular, laminar flows tend to enter the turbulence state, and the effect is better. The flow disturbing device placed in the fluid increases the heat exchange area, so the temperature of the disturber 511 also rises by the radiation effect of the pipe wall, thus enhancing convection heat exchange and achieving extra effects.

The specific embodiments described in the text are used for illustrating the principle of the present disclosure only. Those skilled in the art can make various amendments or supplementations or take similar substitutions on the basis of the described specific embodiments. The amendments, supplementations and substitutions should fall within the principle or the protective scope claimed by the claims of the present disclosure.

What is claimed is:

1. Seawater fluidized ice manufacturing equipment, comprising:
    a compressor for compressing a condensing agent into condensing agent vapor;
    a condenser, connected with the compressor, wherein the condenser is internally provided with a cooling medium, the condensing agent vapor passes through the condenser and then forms a liquefied condensing agent;
    a heat exchanger, connected with the condenser, wherein the heat exchanger is provided with a hydrophobic material coating, the heat exchanger communicates with seawater, seawater is cooled by the liquefied cooling agent to form fluidized ice; wherein the heat exchanger comprises an ice-making barrel and a cooling pipe, the cooling pipe is a semi-round copper pipe, the cooling pipe closely fits the outer wall of the ice-making barrel, the ice-making barrel is connected with a seawater purification module, the cooling pipe receives the condensing agent and enables the seawater in the ice-making barrel to crystallize into fluidized ice;
    wherein the cooling pipe is internally provided with nano-particles and foamed metal, the nano-particles enhance energy exchange in a refrigerant, the foamed metal improves the efficiency of heat exchange between the condensing agent and the seawater;
    a disturber, disposed on the inner wall of the ice-making barrel;
    an ultrasonic generator, connected with the heat exchanger, the ultrasonic generator generating ultrasonic waves and transmitting the ultrasonic wave into the heat exchanger to enable the seawater in the heat exchanger to crystallize into ice;
    an insulating ice storage tank, connected with the heat exchanger, wherein the fluidized ice made in the heat exchanger is conveyed to the insulating ice storage tank for storage;
    a data sampler, wherein the data sampler is connected with thermocouples, and the thermocouples are disposed in the insulating ice storage tank for measuring the temperature of the fluidized ice;
    wherein a liquid storage device, a dryer, and an expansion valve are disposed between the condenser and the heat exchanger, and the liquefied condensing agent handled by the condenser passes through the liquid storage device, the dryer, and the expansion valve in turn and then enters the cooling pipe;
    wherein the ultrasonic generator has four ultrasonic vibrators; the ultrasonic vibrators are ferric ultrasonic vibrators, steel ultrasonic vibrators, or titanium alloy ultrasonic vibrators; and
    the ultrasonic vibrators are round, rectangular or rhomboid.

2. Seawater fluidized ice manufacturing equipment, comprising:
    a compressor for compressing a condensing agent into condensing agent vapor;
    a condenser, connected with the compressor, wherein the condenser is internally provided with a cooling medium, the condensing agent vapor passes through the condenser and then forms a liquefied condensing agent;
    a heat exchanger, connected with the condenser, wherein the heat exchanger is provided with a hydrophobic material coating, the heat exchanger communicates with seawater, seawater is cooled by the liquefied cooling agent to form fluidized ice; wherein the heat exchanger comprises an ice-making barrel and a cooling pipe, the cooling pipe is a semi-round copper pipe, the cooling pipe closely fits the outer wall of the ice-making barrel, the ice-making barrel is connected with a seawater purification module, the cooling pipe receives the condensing agent and enables the seawater in the ice-making barrel to crystallize into fluidized ice;
    wherein the cooling pipe is internally provided with nano-particles and foamed metal, the nano-particles enhance energy exchange in a refrigerant, the foamed metal improves the efficiency of heat exchange between the condensing agent and the seawater;
    a disturber, disposed on the inner wall of the ice-making barrel;
    an ultrasonic generator, connected with the heat exchanger, the ultrasonic generator generating ultrasonic waves and transmitting the ultrasonic wave into the heat exchanger to enable the seawater in the heat exchanger to crystallize into ice;
    an insulating ice storage tank, connected with the heat exchanger, wherein the fluidized ice made in the heat exchanger is conveyed to the insulating ice storage tank for storage;
    a data sampler, wherein the data sampler is connected with thermocouples, and the thermocouples are disposed in the insulating ice storage tank for measuring the temperature of the fluidized ice;

wherein a liquid storage device, a dryer, and an expansion valve are disposed between the condenser and the heat exchanger, and the liquefied condensing agent handled by the condenser passes through the liquid storage device, the dryer, and the expansion valve in turn and then enters the cooling pipe; and wherein the hydrophobic material coating is a perfluoro ethyl vinyl ether (PEVE) coating with a rough surface.

3. The seawater fluidized ice manufacturing equipment according to claim 2, wherein:
the ultrasonic generator has four ultrasonic vibrators; the ultrasonic vibrators are ferric ultrasonic vibrators, steel ultrasonic vibrators, or titanium alloy ultrasonic vibrators; and
the ultrasonic vibrators are round, rectangular or rhomboid.

4. A seawater fluidized ice manufacturing method, using a seawater fluidized ice manufacturing equipment, wherein the seawater fluidized ice manufacturing equipment comprises:
a compressor for compressing a condensing agent into condensing agent vapor;
a condenser, connected with the compressor, wherein the condenser is internally provided with a cooling medium, the condensing agent vapor passes through the condenser and then forms a liquefied condensing agent; and
a heat exchanger, connected with the condenser, wherein the heat exchanger is provided with a hydrophobic material coating, the heat exchanger communicates with seawater, seawater is cooled by the liquefied cooling agent to form fluidized ice; wherein the heat exchanger comprises an ice-making barrel and a cooling pipe, the cooling pipe is a semi-round copper pipe, the cooling pipe closely fits the outer wall of the ice-making barrel, the ice-making barrel is connected with a seawater purification module, the cooling pipe receives the condensing agent and enables the seawater in the ice-making barrel to crystallize into fluidized ice;
wherein the cooling pipe is internally provided with nano-particles and foamed metal, the nano-particles enhance energy exchange in a refrigerant, the foamed metal improves the efficiency of heat exchange between the condensing agent and the seawater;
a disturber, disposed on the inner wall of the ice-making barrel;
an ultrasonic generator, connected with the heat exchanger, the ultrasonic generator generating ultrasonic waves and transmitting the ultrasonic wave into the heat exchanger to enable the seawater in the heat exchanger to crystallize into ice;
an insulating ice storage tank, connected with the heat exchanger, wherein the fluidized ice made in the heat exchanger is conveyed to the insulating ice storage tank for storage;
a data sampler, wherein the data sampler is connected with thermocouples, and the thermocouples are disposed in the insulating ice storage tank for measuring the temperature of the fluidized ice;
wherein the seawater fluidized ice manufacturing method comprises:
S1, compressing the low-temperature and low-pressure condensing agent vapor in the cooling pipe into high-temperature and high-pressure condensing agent vapor, and sending the high-temperature and high pressure condensing agent vapor into the condenser by the compressor, and condensing the condensing agent into liquid in the condenser;
S2, allowing seawater to enter the ice-making barrel and the condensing agent to enter the cooling pipe, improving heat exchange efficiency through the nano-particles and foamed metal, and then condensing the seawater into fluidized ice; and
S3, when the seawater is condensed in the ice-making barrel, generating ultrasonic waves at a frequency of 25 kHz and 40 kHz in the ice-making barrel by using the ultrasonic generator to drive the seawater in the ice-making barrel to generate a cavitation effect and then drive the seawater to crystallize into fluidized ice,
wherein a liquid storage device, a dryer, and an expansion valve are disposed between the condenser and the heat exchanger, and the liquefied condensing agent handled by the condenser passes through the liquid storage device, the dryer, and the expansion valve in turn and then enters the cooling pipe; and
wherein the hydrophobic material coating is a perfluoro ethyl vinyl ether (PEVE) coating with a rough surface.

5. The seawater fluidized ice manufacturing method according to claim 4, characterized in that in step S2 the seawater is filtered by the seawater purification module and then enters the ice-making barrel.

6. The seawater fluidized ice manufacturing method according to claim 4, characterized in that in step S1 the condenser communicates with the seawater and condenses the high-temperature and high-pressure condensing agent vapor into liquid through the seawater.

7. The seawater fluidized ice manufacturing method according to claim 6, characterized in that in step S2 the seawater passes through the liquid storage device, the dryer and the expansion valve in turn and then enters the ice-making pipe.

8. The seawater fluidized ice manufacturing method according to claim 7, characterized in that in step S2 the disturber disturbs the seawater when the seawater enters the ice-making barrel, thus increasing the turbulence level of the fluid and promoting convection heat exchange.

* * * * *